United States Patent [19]

Beeman et al.

[11] 3,875,526

[45] Apr. 1, 1975

[54] TWO-FREQUENCY ALTERNATE TONE GENERATOR

[75] Inventors: Robert H. Beeman, Berkeley; Robert P. Dimmer, Lombard, both of Ill.

[73] Assignee: GTE Automatic Electric Laboratories Incorporated, Northlake, Ill.

[22] Filed: Aug. 2, 1973

[21] Appl. No.: 385,133

[52] U.S. Cl............ 331/47, 331/108 D, 331/117 R, 331/143, 331/179

[51] Int. Cl. ............................................ H03b 5/12

[58] Field of Search....... 331/179, 47, 117 R, 108 D

[56] References Cited

UNITED STATES PATENTS

| | | | |
|---|---|---|---|
| 3,222,619 | 12/1965 | Hekimian | 331/179 |
| 3,386,051 | 5/1968 | Widl | 331/179 X |
| 3,538,450 | 11/1970 | Andrea et al. | 331/179 X |
| 3,560,881 | 2/1971 | Fredricsson | 331/179 |

OTHER PUBLICATIONS

Taylor, "Digitally-Set Audio Oscillator," Wireless World, February 1970, p. 73.

*Primary Examiner*—Siegfried H. Grimm
*Attorney, Agent, or Firm*—Robert J. Black

[57] ABSTRACT

A two-frequency alternate tone generator wherein a tone is generated by a single frequency oscillator whose frequency is changed by adding a capacitor across its tuned circuit by a transistor switch. The transistor switch is turned ON and OFF by an operational amplifier square wave generator, at an established rate.

5 Claims, 1 Drawing Figure

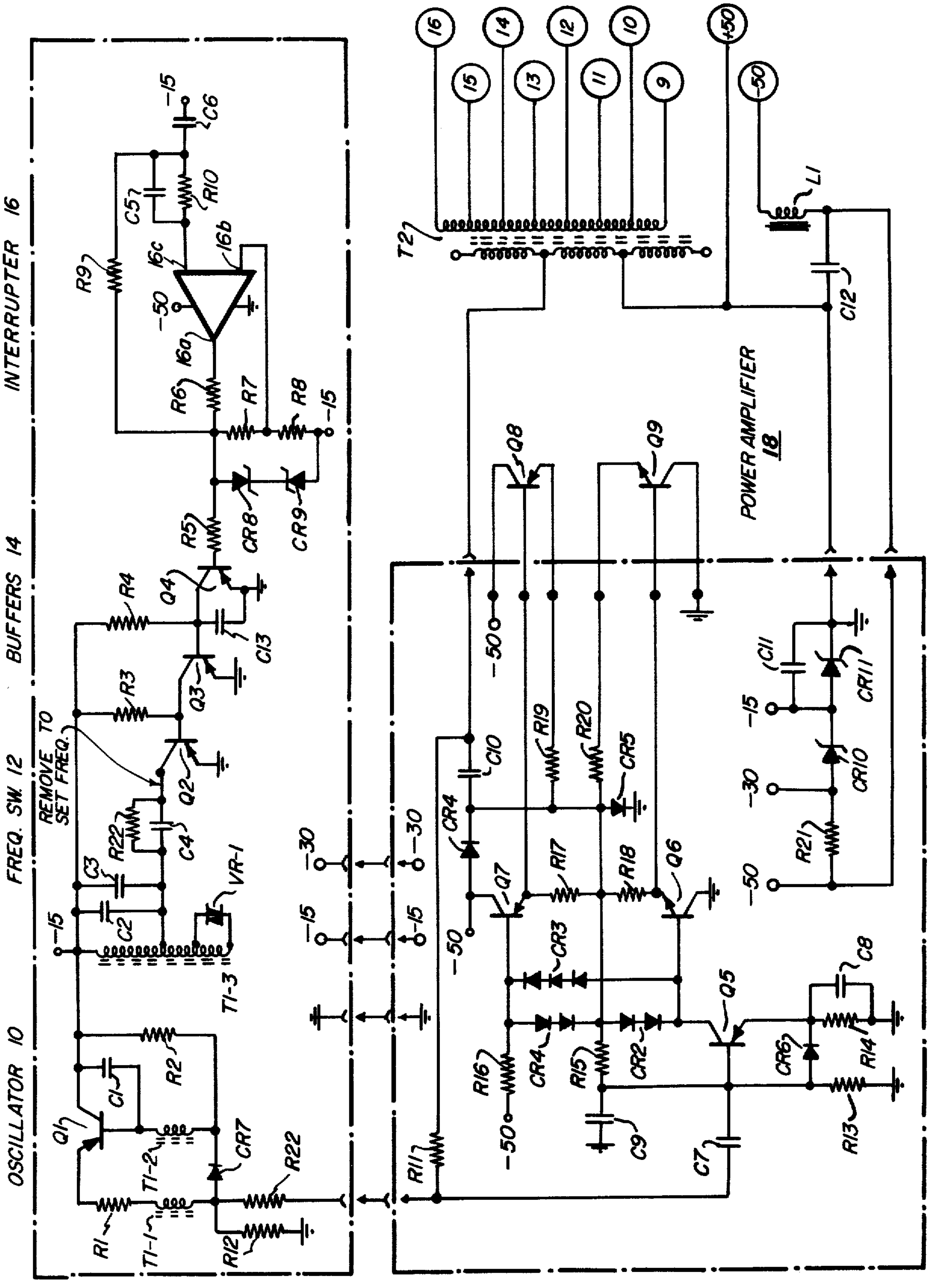
OSCILLATOR 10
FREQ. SW. 12
REMOVE TO SET FREQ.
BUFFERS 14
INTERRUPTER 16
POWER AMPLIFIER 18

TWO-FREQUENCY ALTERNATE TONE GENERATOR

BACKGROUND OF THE INVENTION

This invention, in general, relates to tone generators and, in particular, to an improved alternating tone generator.

The hereinafter described alternating tone generator was specifically designed to provide a two-frequency 852/1336 Hz alternating tone generator. However, its design is simple and flexible, allowing it to be used in all applications requiring alternating tones. It can furnish any audible tone interrupted at any speed by changing constants within the circuit. It does not have the adjustment difficulties now found in most existing TG-1 general class of 5 watt tone generators, and furthermore requires no field adjustment and remains stable under wide environmental conditions. It also consumes about one-fifth of the DC operating current of existing tone generators, and because of this, it dissipates less heat.

SUMMARY OF THE INVENTION

It is an object of the present invention to provide an improved alternating tone generator.

Briefly stated according to this invention, a tone is generated by a single frequency oscillator whose frequency is changed by adding a capacitor across its tuned circuit by a transistor switch. This switch is turned ON and OFF by an operational amplifier square wave generator, at an established rate.

BRIEF DESCRIPTION OF THE DRAWING

The attached drawing is a schematic diagram of the alternating tone generator of the invention.

DESCRIPTION OF THE PREFERRED EMBODIMENT

Referring now to the drawing, the alternating tone generator can be seen to comprise a single frequency oscillator 10, the frequency of which in a specific application is 1336 Hz, whose frequency is changed by adding a capacitor C4 across its tuned circuit by a transistor switch 12 comprising the transistor Q2. This transistor switch 12 is turned ON and OFF by an operational amplifier square wave generator or interrupter 16, the components of which, in the present specific application, are selected for 5PPS. The capacitor C4 when connected across the tuned circuit of the oscillator 10 changes its frequency to 852 Hz. The alternating tone of the tone generator is amplified by a conventional complementary-symmetry power amplifier 18 which has an output capability of 5 watts. Buffer stages 14 are included to amplify and isolate the interrupter 16 from the transistor switch 12.

More particularly, the oscillator 10 and the power amplifier 18 are of a conventional design, with the oscillator 10 having an extra capacitor C4 which is adapted to be connected to its tuned circuit by the transistor switch 12. In the illustrated embodment, the tuned circuit of the oscillator 10 is formed by the winding T1-3 and the capacitors C2 and C3. The varistor VR-1 conducts when the tone reaches the proper level, thus limiting its amplitude to the desired level. When the capacitor C4 is switched into the tuned circuit by the transistor Q2, in the manner more specifically described below, the capacitor C4 appears in parallel with the capacitors C2 and C3, lowering the frequency of oscillation of the oscillator 10. The transistor Q1 is biased ON by current from the −15 volt supply flowing through the resistor R2 to its base electrode. The diode CR7 and the resistor R1 limit the emitter current of transistor Q1 to a value that can be sustained through resistor R1 by the difference to DC voltage across diode CR7 (approximately 0.6V) and the base-emitter voltage of transistor Q1. The resistor R12 further limits the current through transistor Q1. The transistor Q1 is coupled into the tuned circuit by winding T1-1 and T1-2. The effect of these windings on the oscillator is the same as if the transistor Q1 were connected to taps on the tuned circuit as in the well-known Hartley oscillator circuit. The Colpitts oscillator circuit is also similar except that it couples the transistor to the tuned circuit through a series string of capacitors. The capacitor C1 suppresses unwanted UHF oscillations by reducing the transistor gain above the audio range.

The interrupter 16 controls the rate of frequency change of the tone generator and, for the purpose of describing its operation, assume that its output **16*a* is a +E. Its positive input terminal 16*b* will be approximately at +9/25E. The capacitor C6 will be charged via the resistor R9, until the voltage at the negative input 16C exceeds +9/25E. Because of the high gain of the operational amplifier forming the interrupter 16**, the output voltage will flip to −E. The operational amplifier will act the same in the negative direction and flip to the original status, starting the cycle again.

The positive feedback via the resistor R9 aids in driving the operational amplifier more rapidly to saturation, and the resistor R6 limits the current during clipping to within 2 ma. Normally, a saw-tooth wave is produced but with the back-to-back Zener diodes CR8 and CR9, the output is limited, insuring a clean, flat topped wave by clipping the output below the amplitude at which overshoot, ringing, or rounding can occur. The capacitor C5 and the resistor R10 help to maintain a 50 percent ON-50 percent OFF square wave pulse.

The square wave output pulses pass through the buffer stage 14, with some amplification, to the base of the transistor Q2 forming the transistor switch 12. When the base voltage of transistor Q2 is negative, the transistor Q2 turns ON and, in doing so, connects the capacitor C4 to ground, via its collector-emitter circuit. It should be noted that capacitor C11, shown within the block containing power amplifier 18, provides a low AC impedance path between −15V and ground. Capacitor c$ when connected to ground through transistor Q2 is thus effectively connected through the low AC impedance path of capacitor C11 in parallel with the capacitors C2 and C3 in the tuned circuit. Thus, the frequency of the oscillator 10 is changed, in the specific indicated application, from 1336 hz to 852 Hz. When the square wave pulse becomes positive, the transistor Q2 is turned OFF, thus removing the capacitor C4 from ground, and the oscillator 10 returns to its initial frequency of 1336 Hz. The resistor R22 discharges the capacitor C4 during non-conduction of the transistor Q2, thereby permitting the oscillator 10 to start instantly on the alternate frequency.

The alternating tone output of the oscillator 10 is amplified by the power amplifier 18 which, as indicated above, is a conventional complementary-symmetry power amplifier with an output capability of 5 watts.

From the above description, it can be seen that the tone generator can furnish any audible tone interrupted at any speed by changing constants within the circuit. For example, by changing the value of the capacitor C4, the alternate frequency of the oscillator 10 can be changed, and by changing the value of the capacitor C6, the rate or speed at which the audible tone is interrupted can be changed.

It will thus be seen that the objects set forth above, among those made apparent from the preceding description, are efficiently attained and certain changes may be made in the above construction. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. A two-frequencey alternating tone generator comprising: a single frequency oscillator; a source of potential for supplying operating voltage to said single frequency oscillator; said single frequency oscillator including a tuned circuit and capacitance means having one terminal thereof connected to said tuned circuit and the other terminal thereof connectible to said potential source to thereby connect said capacitance means into said tuned circuit; an operational amplifier square-wave generator; switch means comprising a transistor rendered conductive by said operational amplifier square-wave generator to connect said capacitance means to said source of potential and thus into said tuned circuit to change the frequency of said oscillator; said operational amplifier square-wave generator coupled to and operating said switch means to connect said capacitance means to said source of potential at an established periodic rate; a power amplifier for amplifying the output of said oscillator; and resistance means coupled across said capacitance means for discharging said capacitance means during non-conduction of said transistor to thereby permit said oscillator to start instantly on said changed frequency.

2. The two-frequency alternating tone generator of claim 1, further including at least one buffer stage coupled between said switch means and said operational amplifier square wave generator for amploying the output of the latter and for isolating it from said switch means.

3. The two-frequency alternating tone generator of claim 1, wherein said operational amplifier square wave generator has an output terminal, a postivie input terminal and a negative input terminal, the voltage at said output terminal periodically switching between an established positive voltage and an established negative voltage to render said transistor conductive and non-conductive.

4. The two-frequency alternating tone generator of claim 3, wherein the periodic rate at which said voltage at said output terminal of said operational amplifier square wave generator is switched is controlled by capacitance means coupled with said negative input terminal and charged by means of a positive feedback loop, the voltage at said output terminal being switched from said positive voltage to said negative voltage when the charge on said capacitance means exceeds the voltage at said positive input terminal and being switched from said negative voltage to said positive voltage when the charge on said capacitance exceeds the voltage at said negative input terminal.

5. The two-frequency alternate tone generator of claim 1, further including a pair of Zener diodes connected back-to-back at the output terminal of said operational amplifier square wave generator for limiting the output voltage thereof to thereby provide a clean, flat topped square wave.

* * * * *